US010233882B2

(12) United States Patent
Kern et al.

(10) Patent No.: US 10,233,882 B2
(45) Date of Patent: Mar. 19, 2019

(54) SERVICEABLE DIESEL FUEL FILTER ASSEMBLY

(71) Applicant: Sogefi Engine Systems USA, Inc., Rochester Hills, MI (US)

(72) Inventors: Tom Kern, Rochester Hills, MI (US); Francis Rolland, Rochester Hills, MI (US); Fabien Sanet, Rochester Hills, MI (US)

(73) Assignee: Sogefi Engine Systems USA, Inc., Rochester Hills, MI (US)

( * ) Notice: Subject to any disclaimer, the term of this patent is extended or adjusted under 35 U.S.C. 154(b) by 93 days.

(21) Appl. No.: 15/351,984

(22) Filed: Nov. 15, 2016

(65) Prior Publication Data

US 2017/0067427 A1    Mar. 9, 2017

Related U.S. Application Data

(63) Continuation-in-part of application No. 15/258,485, filed on Sep. 7, 2016.
(Continued)

(51) Int. Cl.
*F02M 37/22* (2006.01)
*B01D 35/00* (2006.01)
(Continued)

(52) U.S. Cl.
CPC ........... *F02M 37/221* (2013.01); *B01D 29/07* (2013.01); *B01D 35/005* (2013.01); *B01D 35/18* (2013.01);
(Continued)

(58) Field of Classification Search
CPC .. F02M 37/221; B01D 35/005; B01D 36/001; B01D 29/07; B01D 35/18; B01D 36/04; B01D 2201/50
USPC .. 210/495, DIG. 5, 493.3, 248, 167.02, 120, 210/472, 194
See application file for complete search history.

(56) References Cited

U.S. PATENT DOCUMENTS

| 4,491,120 | A | 1/1985 | Hodgkins |
| 4,618,423 | A | 10/1986 | Hodgkins |

(Continued)

FOREIGN PATENT DOCUMENTS

| EP | 0 362 114 | 4/1990 |
| EP | 3 141 293 | 3/2017 |

(Continued)

*Primary Examiner* — Madeline Gonzalez
(74) *Attorney, Agent, or Firm* — Warner Norcross & Judd LLP

(57) ABSTRACT

A filter assembly for filtering diesel fuel used by a diesel engine includes a housing that defines a housing opening, an unfiltered fuel inlet and a filtered fuel outlet. A panel is matable to the housing for sealably enclosing the opening for forming a housing chamber. A panel encloses the opening and defines an inner surface. A filter element formed from a peripheral wall includes filter media defining an unfiltered side and a filtered side of said filter element. The peripheral wall is sealably affixed to the inner surface enclosing the unfiltered side of the filter element from the housing chamber defining an unfiltered chamber. A permeable barrier is affixed to the peripheral wall defining a filtered chamber with the filtered side of said filter element receiving filtered fuel through the filter media. The housing chamber receives filtered fuel through though the permeable barrier.

14 Claims, 4 Drawing Sheets

Related U.S. Application Data

(60) Provisional application No. 62/215,332, filed on Sep. 8, 2015.

(51) Int. Cl.
    *B01D 36/00*     (2006.01)
    *B01D 29/07*     (2006.01)
    *B01D 36/04*     (2006.01)
    *B01D 35/18*     (2006.01)

(52) U.S. Cl.
    CPC ........... *B01D 36/001* (2013.01); *B01D 36/04* (2013.01); *B01D 2201/50* (2013.01)

(56) References Cited

U.S. PATENT DOCUMENTS

| | | | |
|---|---|---|---|
| 4,860,713 A | | 8/1989 | Hodgkins |
| 5,904,845 A | * | 5/1999 | Girondi .............. B01D 17/0211 210/306 |
| 6,716,349 B2 | * | 4/2004 | Baracchi .............. B01D 17/045 210/299 |
| 7,954,647 B2 | * | 6/2011 | Hiranaga ................ B01D 27/08 210/436 |
| 2003/0057146 A1 | * | 3/2003 | Rickle .................... B01D 29/21 210/243 |
| 2006/0180541 A1 | | 8/2006 | Hueppchen et al. |
| 2014/0174410 A1 | * | 6/2014 | Myers .................... F02M 33/08 123/514 |
| 2017/0067426 A1 | | 3/2017 | Da Costa et al. |

FOREIGN PATENT DOCUMENTS

| | | |
|---|---|---|
| WO | 03/099414 | 12/2003 |
| WO | 2005/010339 | 2/2005 |

\* cited by examiner

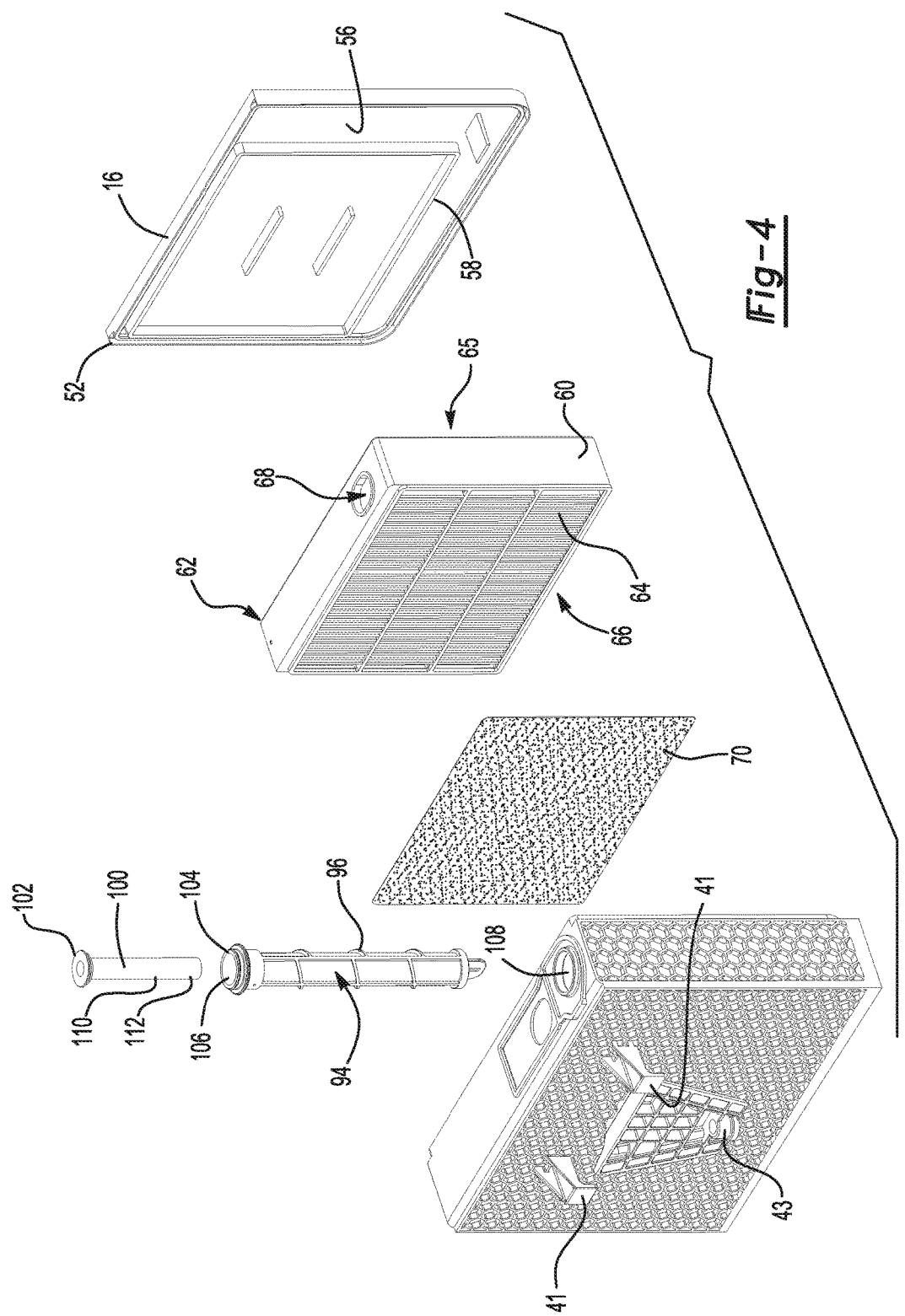

SERVICEABLE DIESEL FUEL FILTER ASSEMBLY

PRIOR APPLICATIONS

This application is a continuation-in-part application claiming priority to U.S. patent application Ser. No. 15/258,485 filed Sep. 7, 2016, which claims priority to U.S. Provisional Patent Application No. 62/215,332 filed Sep. 8, 2015, the contents of which are incorporated herein by reference.

TECHNICAL FIELD

The invention of the present application relates generally toward a filtration assembly for a diesel fuel system. More specifically, the invention of the present application relates toward a serviceable configuration of a filter assembly for a diesel fuel system.

BACKGROUND

Diesel fuel engines have become increasingly complex to meet both mileage requirements and environmental standards. As such, diesel fuel being delivered to these highly technical engines is required to be both particulate-free and substantially absent of water and air, all of which can reduce diesel fuel engine performance and durability.

Presently, diesel fuel is filtered using a cylindrical filter making use of a concentric filtration arrangement. A particulate filter that separates particulates from the diesel fuel is disposed within a tubular housing. A water separator, when included, is typically aligned in the central portion of the tubular housing in a concentric orientation relative to the filtration media. The water separator reduces the amount of water disposed in the diesel fuel prior to delivering diesel fuel to the diesel engine. During operation, diesel fuel passes through the particulate filter media and subsequently through the water filtration system formed from one or more concentric layers before exiting the cylindrical filter. Although this design has proved functional for many years, the can-like shape of the filter housing has become increasingly problematic. For example, decreasing packaging space for filtration systems within an engine compartment is driving alternative designs for filtration assemblies. Limited space between the filter media and the water separator does not provide sufficient diffusion of the water prior to separation, an arrangement that has not proved adequate with can-like shape filtration assemblies.

In addition, improved service of fuel filtration systems is also of interest to both the consumers, the shops that service the fuel filtration systems and the customers. Service requiring technical proficiency can result in inadequate fuel filtration or failure of the filtrations system altogether.

Therefore, it would be desirable to provide an optimized design of a filtration assembly capable of meeting the demands of new, highly technical diesel engines, while providing improved serviceability.

SUMMARY

A filter assembly for filtering diesel fuel used by a diesel engine includes a housing that defines a housing opening, an unfiltered fuel inlet and a filtered fuel outlet. A panel is matable to the housing for sealably enclosing the opening for forming a housing chamber. The panel defines an inner surface disposed within said housing chamber when the panel encloses the opening defined by the housing. A filter element defined by a peripheral wall includes filter media that is sealably engaged and defines an unfiltered side and a filtered side of said filter element. The peripheral wall is sealably affixed to the inner surface of the panel enclosing the unfiltered side of the filter element from the housing chamber to define an unfiltered chamber that is disposed in fluid communication with the unfiltered fuel inlet. A permeable barrier is affixed to the peripheral wall and defines a filtered chamber with the filtered side of the filter element and receives filtered fuel from the unfiltered chamber through the filter media. The housing chamber receives filtered fuel through the permeable barrier and is fluidly connected with the filtered fuel outlet.

The simplified design of the fuel filter of the present invention provides a low cost, fully serviceable fuel filter. The reduced complexity makes use of the housing walls to seal the unfiltered side of the filter element. In addition, sealing the panel onto which the filter element is affixed to the housing simplifies the housing design reducing the number of parts required of the fuel filter. The simplified design and associated low cost provides the ability to merely discard the fuel filter, when desired, rather than disassemble and reconfigure the filter element.

BRIEF DESCRIPTION OF THE DRAWINGS

Other advantages of the present invention will be readily appreciated, as the same becomes better understood by reference to the following detailed description when considered in connection with the accompanying drawings:

FIG. 4 shows an exploded view of the filter assembly;

DETAILED DESCRIPTION

Figure 1:
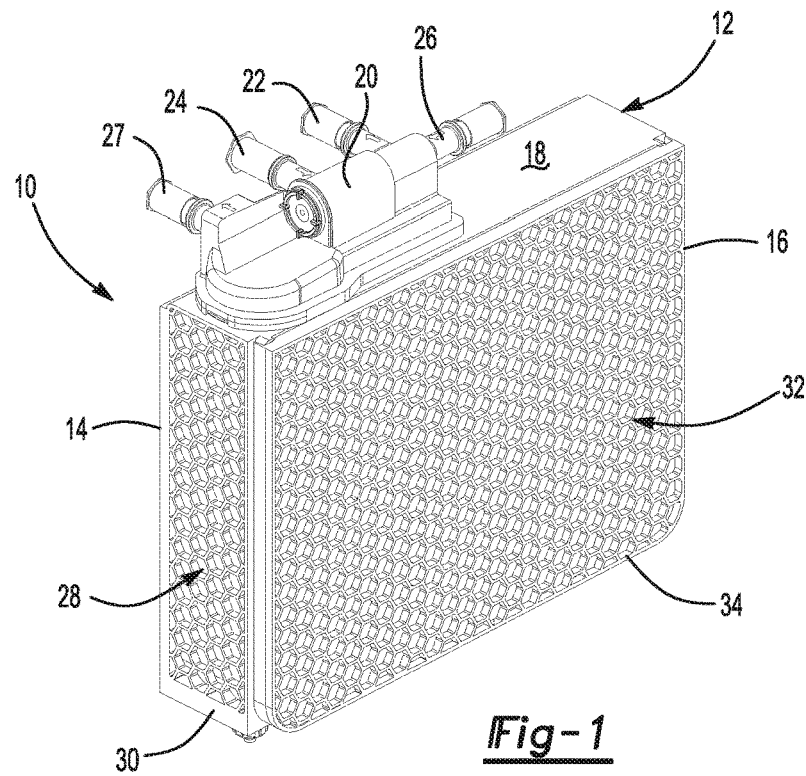
FIG. 1 shows a perspective view of the fuel filter assembly of the present invention.

Referring to FIG. 1, the filtration assembly for filtering diesel fuel used by diesel engine (not shown) is generally shown at 10. The assembly 10 includes a housing 12 defined by a main housing element 14 and a panel 16. The panel 16 is sealably secured to the main housing element 14 to obtain fuel within the housing 12 as will be explained further herein below. In one embodiment, the panel 16 is irremovably affixed to the main housing element 14.

The main housing element 14 includes an upper wall 18 onto which a manifold 20 is secured. The manifold 20 receives and evacuates diesel fuel from the housing 12. An unfiltered fuel inlet 24 is interconnected to the manifold 20 for delivering unfiltered fuel to the housing 12. A filtered fuel outlet 27 evacuates filtered fuel from the housing 12 and is interconnected with the diesel engine in a known manner.

Additionally, the manifold 20 includes a recirculation inlet 26 and a recirculation outlet 22 that respectively receives and returns fuel to the fuel tank. It should be understood to those of ordinary skill in the art that the recirculation fuel is used to heat or otherwise warm the fuel filter assembly 10 to improve performance.

A plurality of housing element webs 28 substantially covers an exterior surface 30 of the main housing element 14 to provide structural integrity to the main housing element 14. In a like manner, a plurality of panel webs 32 is disposed upon an exterior panel surface 34.

Figure 2:
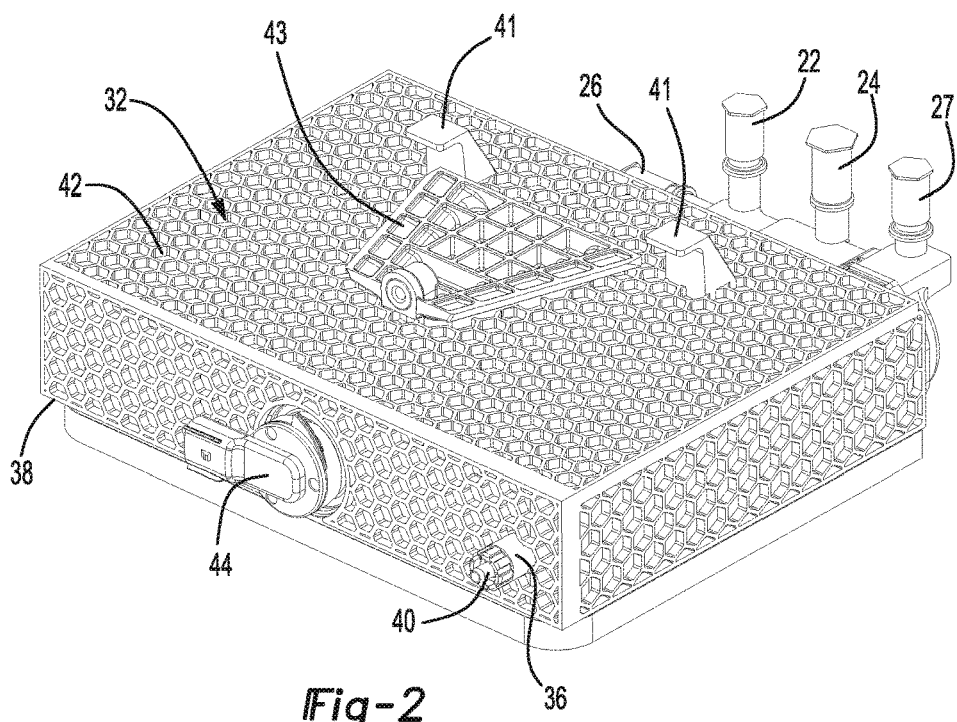
FIG. 2 shows an alternative perspective view of the fuel filter assembly.

Referring to FIG. 2, it should be readily apparent that substantially the entire exterior surface of the housing element includes housing element webs 28 for structural integrity. A drain 36 is disposed in a bottom panel 38 of the main housing element 14, the purpose of which will be explained further herein below. A plug 40 selectively prevents fuel from exiting the housing 12 through the drain 36. It should be readily apparent that the housing 12 includes a cuboid configuration enabling the filter assembly 10 to be conveniently located within a tight packaging area within an engine compartment or other location of a diesel vehicle. As such, cooperable links 41 are included on a rear wall 42 of the main housing element 14 to assist securing the filter assembly 10 at a desired location upon the vehicle. In addition, a fastener element 43 releasably secures the filter assembly with a fastener (not shown) at the desired location.

Figure 3:
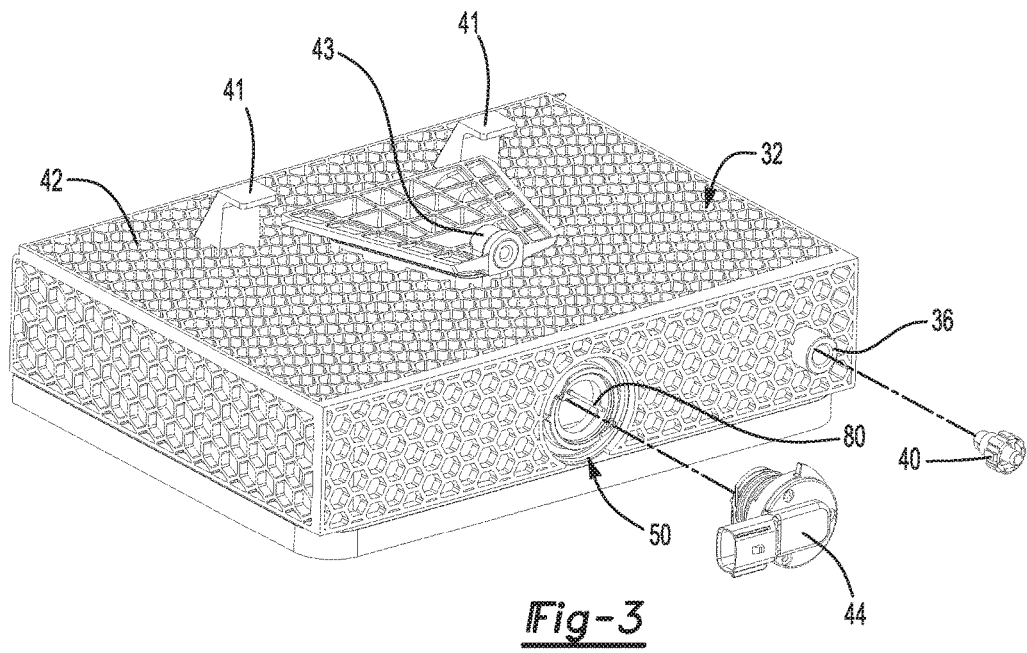
FIG. 3 shows a partially exploded perspective view of the fuel filter.

The bottom wall 38 of the main housing element 14 receives a sensor element 44 as best seen in FIG. 3. The sensor element 44 connects to an engine controller (not shown) via a wire harness (not shown) that includes an electrical ground. The electrical connector is received through a sensor aperture 50 disposed in the bottom wall 38 of the main housing element 14. The sensor element 44 senses the amount of water content disposed in the fuel filter assembly 10, which may be drained by releasing the plug 40 from the drain 36 as will be explained further herein below.

Referring now to FIG. 4, filtration of diesel fuel will be readily apparent by way of explanation of the exploded view of the inner workings of the filter assembly 10. The panel 16 includes a bounding area 52 to facilitate securing the panel 16 in a sealable manner to the main housing element 14. It should be understood by those of ordinary skill in the art that the bounding area 52 is sealably secured by way of adhesive, laser welding, sonic welding, sealant, or an equivalent.

The panel 16 defines an inner surface 56 that includes a mating rib 58. The mating rib 58 is configured to receive a peripheral wall 60 of a filter element 62. The filter element 62 includes filter media 64 having a peripheral edge sealed to the peripheral wall 60 to define an unfiltered side 65 and a filtered side 66 of the filter element 62.

As such, when the peripheral wall 60 of the filter element 62 is mated to the inner surface 56 of the panel 16, an unfiltered chamber identified by element 65 is defined between the filter media 64 and the inner surface 56. An unfiltered fuel aperture 68 receives unfiltered fuel from the unfiltered fuel inlet 24. The unfiltered fuel received in the unfiltered fuel chamber 68 passes through the filter media 64 into a filtered chamber defined between the filter media 64 and a water diffuser and/or separator 70. The water diffuser and/or separator 70 allows cleaned fuel to pass while diffusing and/or separating water droplets disposed in the fuel, the purpose of which will be explained further herein below. As such, it should be understood that the water diffuser 70 is attached and may be sealed to the peripheral wall 60 of the filter element 62 so that fuel exiting the filter element 62 may partially or only pass through the water diffuser 70.

Figure 5:
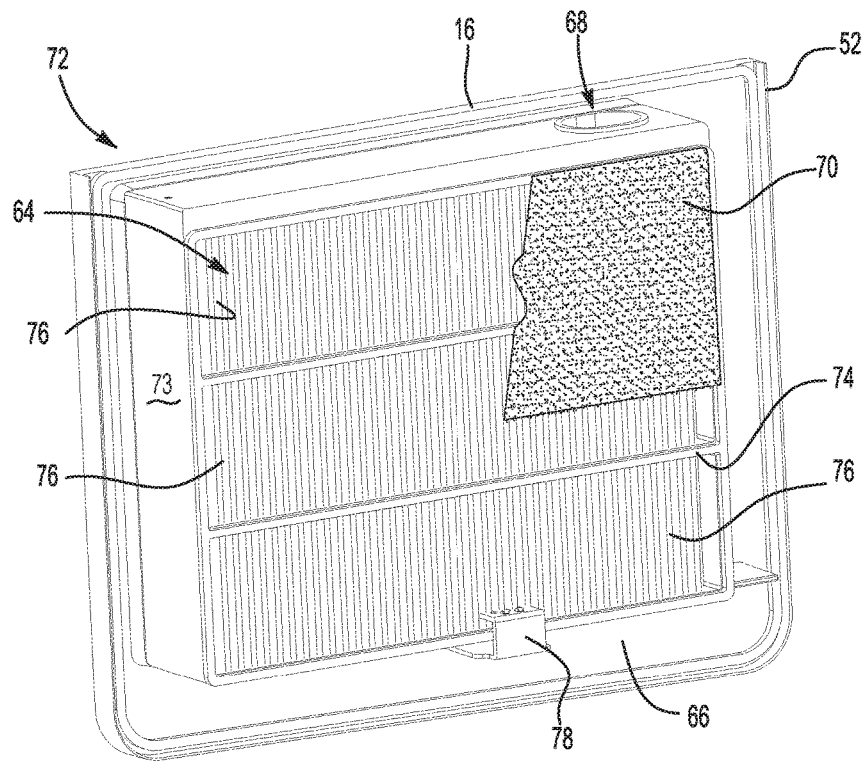
FIG. 5 shows a front view of the filter element.

When fully assembled, the filter element 62 and the panel 16 form a filtration module 72 best represented in FIG. 5. Formation of the filtration module 72 simplifies manufacture of the filter assembly 10 and also reduces mass of the filter assembly 10 by elimination of various components of the prior embodiment. For ease of understanding, the filtration module 72 shown in FIG. 5 partially excludes the water diffuser 70. As such, it is readily apparent that the filter media 64 defined as a continuous corrugated sheet forms the unfiltered chamber 68 with the inner surface 56 of the panel 16. Opposing ribs 74 provide structural support to the peripheral wall 60 of the filter element 62 by extending between opposing vertical side walls 73 defining the peripheral wall 60. In an alternate embodiment, the ribs 74 are defined as shelves onto which separate filter sections 76 are sealed.

A conductive member 78 is received by the filter media 64 by features that are complimentary to the corrugations disposed in the filter media 64. The conductive member 78 contacts a connecting pin 80 integrated to the WIF sensor 44. The connecting pin 80 contacts a ground disposed in the electrical connector to dissipate static electricity generated by fuel passing through the filter media 64.

Figure 6:
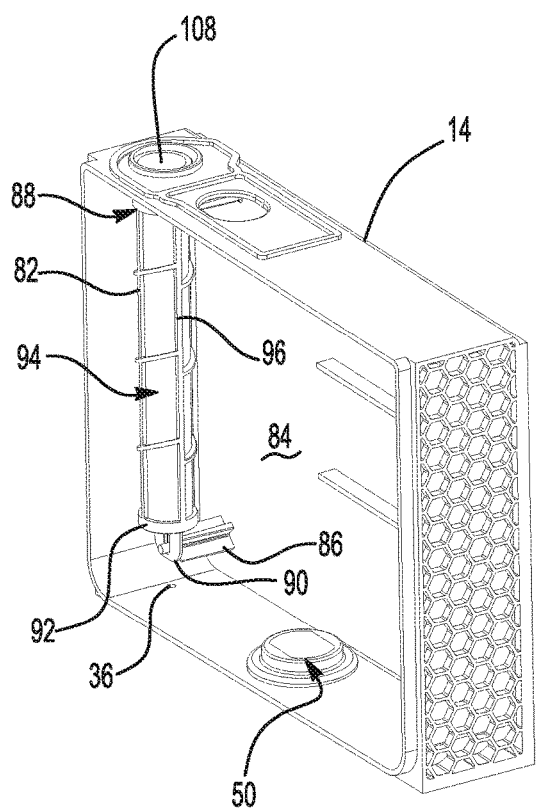
FIG. 6 shows a perspective view of the housing element with an installed water separator assembly.

Referring now to FIG. 6, a water separator assembly 82 (also seen in FIG. 4) is secured to a rear surface 84 of the main housing element 14 by way of a connector 86. The water separator assembly 82 is disposed in a substantially vertical orientation within the filter assembly 10. When secured to the upper wall 108 at an upper end 88 and to the connector 86 by way of a receptor 90 disposed at a lower end 92. A water separator 94 takes the form of a hydrophobic screen extending between openings of a support lattice 96 that defines a tubular frame. The water separator 94 allows filtered fuel to pass into the support lattice 96 defined by the support lattice 96 while preventing water from entering the tubular frame. Because water has a higher specific gravity than diesel fuel, water collecting upon the water separator 94 collects at the bottom of the filter assembly 10 where it may be released from the assembly 10 by removing the plug 40 from the drain 36.

As best seen in FIG. 4, a tube 100 extends downwardly into the support lattice 96 of the water separator assembly 94. The tube 100 includes a sealed portion 102 that seals to an upper flange 104 of the support lattice 96. A grommet 106 cooperates with the sealed portion 102 and an upper flange 104 to seal to the upper wall 18 of the main housing element 14 at the clean fuel aperture 108 through which clean fuel is delivered to the filtered fuel outlet 27.

The filter assembly 10 is also configured to reduce, and even recirculate air trapped in the diesel fuel from entering the diesel engine through the filter assembly 10. As such, the tube 100 includes an upper air aperture 110 and a lower air aperture 112. The upper air aperture 110 includes a similar cross-sectional area as does the lower air aperture 112 to balance evacuation of air from the tube 100. Therefore, air entering the tube 100 is trapped between the upper air aperture 110 and the lower air aperture 112 and will not be transferred out of the filter assembly through the filtered fuel outlet 27.

The invention has been described herein in an illustrative manner, and it is to be understood that the terminology which has been used is intended to be in the nature of words of description rather than of limitation. Obviously, any modifications and variations of the invention are possible in light of the above teachings. The invention can be practiced otherwise than is specifically described within the scope of the appendant claims.

What is claimed is:

1. A filter assembly for filtering diesel fuel used by a diesel engine, comprising:
    a housing defining a housing opening;
    an unfiltered fuel inlet defined by the housing and a filtered fuel outlet defined by the housing;
    a panel being matable to said housing for sealably enclosing said opening thereby forming a housing chamber, said panel defining an inner surface disposed within said housing chamber when said panel encloses said opening, wherein said panel lacks an unfiltered fuel inlet and lacks a filtered fuel outlet;

a filter element defined by a peripheral wall including filter media sealably engaged therewith defining an unfiltered side and a filtered side of said filter element, said peripheral wall surrounding said filter media along a perimeter of said filter media and said peripheral wall extends to an unfiltered side face and a filtered side face, said unfiltered side face of said peripheral wall being sealably affixed to said inner surface of said panel thereby enclosing said unfiltered side of said filter element from said housing chamber defining an unfiltered chamber being disposed in fluid communication with said unfiltered fuel inlet; and a permeable barrier affixed to said peripheral wall defining a filtered chamber with said filtered side of said filter element and receiving filtered fuel from said unfiltered chamber through said filter media;

said housing chamber receiving filtered fuel through said permeable barrier and being fluidly connected with said filtered fuel outlet.

2. The filter assembly set forth in claim 1, wherein said housing comprises a cuboid configuration.

3. The filter assembly set forth in claim 1, wherein said permeable barrier comprises a water diffuser for at least one of diffusing and separating water droplets disposed in the filtered fuel.

4. The filter assembly set forth in claim 1, including a water separator assembly disposed externally to said filter element receiving filtered fuel disposed inside said housing chamber.

5. The filter assembly set forth in claim 4, wherein said filtered fuel outlet is fluidly connected to said water separator assembly for receiving clean fuel from said water separator assembly.

6. The filter assembly set forth in claim 4, wherein said housing includes a drain located beneath said water separator assembly for draining water from said filter assembly.

7. The filter assembly set forth in claim 1, wherein said panel is fixedly secured to said housing by a laser weld, sonic weld, vibration weld, adhesive, or hot melt.

8. The filter assembly set forth in claim 1, wherein said unfiltered fuel inlet and said filtered fuel outlet are interconnected with a manifold being affixed to said housing.

9. The filter assembly set forth in claim 8, wherein said manifold includes a recirculation inlet and a recirculation outlet for recirculating unfiltered fuel through said filter assembly.

10. The filter assembly set forth in claim 1, wherein said filter media comprises a continuous sheet of corrugated filter media.

11. The filter assembly set forth in claim 1, wherein said filter element includes a conductive member interconnecting said filter media with a ground element thereby dissipating static electricity generated by fuel passing through said filter element.

12. The filter assembly set forth in claim 4, wherein said water separator assembly includes an air modulator for modulating an amount of air passing through said water separator assembly.

13. The filter assembly set forth in claim 12, wherein said air modulator comprises a substantially vertical tube defining an upper air aperture and a lower air aperture spaced beneath said upper air aperture.

14. The assembly set forth in claim 1, wherein said inner surface of said panel includes a receptor for sealably mating said panel to said peripheral wall of said filter element.

* * * * *

UNITED STATES PATENT AND TRADEMARK OFFICE
CERTIFICATE OF CORRECTION

Page 1 of 1

PATENT NO. : 10,233,882 B2
APPLICATION NO. : 15/351984
DATED : March 19, 2019
INVENTOR(S) : Tom Kern et al.

It is certified that error appears in the above-identified patent and that said Letters Patent is hereby corrected as shown below:

In the Claims

Column 6, Line 32, Claim 14:
"The assembly set forth in claim 1"
Should read:
--The filter assembly set forth in claim 1--

Signed and Sealed this
Ninth Day of July, 2019

Andrei Iancu
*Director of the United States Patent and Trademark Office*